United States Patent
Iodice et al.

(10) Patent No.: US 9,193,136 B2
(45) Date of Patent: Nov. 24, 2015

(54) MULTILAYER FILMS FOR NAKED COLLATION

(75) Inventors: Pietro Iodice, Cuneo (IT); Michael Pierse, Alessandria (IT)

(73) Assignee: IRPLAST S.p.A., Empoli (IT)

( * ) Notice: Subject to any disclaimer, the term of this patent is extended or adjusted under 35 U.S.C. 154(b) by 594 days.

(21) Appl. No.: 13/464,615

(22) Filed: May 4, 2012

(65) Prior Publication Data

US 2012/0279183 A1  Nov. 8, 2012

(30) Foreign Application Priority Data

May 6, 2011 (IT) ............................. MI2011A0770

(51) Int. Cl.
| | |
|---|---|
| *A47G 19/22* | (2006.01) |
| *B29D 22/00* | (2006.01) |
| *B32B 7/02* | (2006.01) |
| *B32B 27/00* | (2006.01) |
| *B32B 27/08* | (2006.01) |
| *B32B 27/32* | (2006.01) |

(52) U.S. Cl.
CPC . *B32B 27/08* (2013.01); *B32B 7/02* (2013.01); *B32B 27/32* (2013.01); *B32B 2250/03* (2013.01); *B32B 2250/242* (2013.01); *B32B 2250/40* (2013.01); *B32B 2307/31* (2013.01); *B32B 2307/518* (2013.01); *Y10T 428/24942* (2015.01)

(58) Field of Classification Search
CPC .......... B32B 7/02; B32B 27/08; B32B 27/32; B65B 11/00
USPC ............. 428/34.6–34.7, 35.2, 35.7, 212–220, 428/500–523; 53/65, 85, 105, 461
See application file for complete search history.

(56) References Cited

U.S. PATENT DOCUMENTS

| | | | |
|---|---|---|---|
| 4,399,181 A | 8/1983 | Yoshimura et al. | |
| 4,853,602 A | 8/1989 | Hommes et al. | |
| 2009/0205994 A1* | 8/2009 | Sase et al. .................. | 206/524.6 |
| 2010/0224530 A1 | 9/2010 | Singh et al. | |

FOREIGN PATENT DOCUMENTS

| | | |
|---|---|---|
| EA | 000702 B1 | 10/1998 |
| EA | 005720 B1 | 6/2005 |
| RU | 60916 U1 | 2/2007 |
| RU | 2297331 C2 | 4/2007 |
| WO | WO 2007/051791 A2 | 5/2007 |

* cited by examiner

*Primary Examiner* — Andrew M Tecco
*Assistant Examiner* — Praachi M Pathak
(74) *Attorney, Agent, or Firm* — Arent Fox LLP

(57) ABSTRACT

Multilayer films for naked collation packaging of single packs comprising at least a core layer, an inner layer and an outer layer, wherein the inner and outer layer, equal to or different from each other, consist of one or more olefin (co) polymers wherein:
  outer layer: (co)polymers having a melting point in the range 65° C.-85° C.;
  inner layer: (co)polymers having a melting point in the range 65° C.-90° C.;
  core layer: (co)polymers of propylene and/or butene; wherein the film wrapping the single packs consists or one or more olefin (co)polymers having a melting point higher than 120° C.

16 Claims, No Drawings

MULTILAYER FILMS FOR NAKED COLLATION

The present invention relates to multilayer films for naked collation of packs to form packages of 6 or more packs, which can be removed without using cutting tools, as knives, scissors, etc.

More specifically the present invention relates to multilayer films for naked collation of cigarette packs to form packages of 6-10 or more packs arranged one close to the other having a sealing temperature comprised between 60° C. and 80° C., preferably 60° C.-78° C., more preferably 70-78° C.

More specifically the present invention deals with multilayer films for naked collation of cigarette packs to form packages of 6 or more packs arranged one close to the other having the above sealing temperature between the outer layer/outer layer, inner layer/inner layer, inner layer/outer layer and between the outer layer/inner layer of the naked collation film and at the same time without any sealing between the inner layer of the naked multilayer film and the film of the single packs (e.g. cigarette packs).

It is well known in the art that naked collation has the purpose to wrap and keep together more packs, generally cigarette packs, assembled in groups of 6, 10 or more.

Wrapping is carried out with a multilayer film that has the advantage of eliminating paper boxes or cardboard boxes used in the prior art. The industrial advantages of the naked collation are clear as they allow to avoid the use of paper or cardboard boxes, that require a separate manufacturing process and at the end the filled cardboard boxes must be wrapped with a film to avoid the damaging of the paper box during the transportation due to rubbing or friction. Therefore the naked collation system allows to eliminate one step in the packaging of cigarette packs. The main feature required to a naked collation film is its sealability. The two film surfaces, the inner and the outer one, must seal as it follows: outer/outer, inner/inner, inner/outer. Further the naked collation film must not seal to the film used for wrapping the single cigarette packs. This feature is required in order to avoid that during the removal of the naked collation film for opening the packaging, the film of the single cigarette packs is not damaged or broken. From the commercial point of view possible breaks or damages of the cigarette pack film brings to the discharge of the single pack as the market does not accept this kind of packs.

The multilayer film must furthermore possess good mechanical properties, especially in the longitudinal direction (MD) to allow an high collation speed without breaks and maintain the cut length for the naked collation application.

In fact it is well known that when the naked collation packages of cigarette packs are delivered to the points of sale, the collation film must be removed to expose on the shelf the cigarette packs.

The need was felt to have available naked collation multilayer films easily removable without using cutting tools, so carrying out the removal under safety conditions.

Acrylic coating multilayer films for naked collation of cigarette packs are known in general. These films have several drawbacks; their cost is high as the acrylic resin must be sprayed on the multilayer film. Further environmental problems arise for the recycle and the disposal of said acrylic resins. Another disadvantage of these films is the release of white powder, coming from the acrylic resin, on the machine rolls used for packaging. It must be noted that this drawback takes place after few hours during the naked collation process. This brings to a downtime in the process to clean the machines to avoid the powder dispersion into the environment and thus representing a health risk for the workers. In addition it must be avoided that the powder deposits on the single packs as this can create safety and health problems. However the most remarkable drawback of these prior art naked collation films is that they require the use of cutting tools, for example knives or scissors, for their removal. As this operation has caused considerable inconveniences to the users, above all from the safety point of view, the need was felt to have available films for naked collation removable from the cigarette packages without the use of cutting tools.

Multilayer films have been surprisingly and unexpectedly found by the Applicant that allow to solve the above technical problem, i.e. the removal of the naked collation film without using mechanical tools, such as knives, scissors, etc. and wherein the sealing temperature between the outer layer/outer layer, inner layer/inner layer, outer layer/inner layer, ranges from 60° C. and 80° C., at the same time without sealing between the inner layer of the multilayer film and the film wrapping the single cigarette packs.

It is besides requested that the naked collation films, commercially available in reels, can be used for producing naked collation packages on manufacturing lines working at a machine speed in the range 70-100 packages/min without sticking of the naked collation film to the machine rolls and to the film wrapping the single packs (for example, the single cigarette packs), therefore with a percentage of waste lower than 1%, preferably lower than 0.1%, more preferably lower than 0.01%.

It is an object of the present invention multilayer films for naked collation of single packs (for example, cigarette packs) to form packages comprising at least a core layer, an inner layer and an outer layer, wherein:

the outer layer comprises olefin (co)polymers having a melting point in the range 65° C.-85° C., preferably 65° C.-80° C., still more preferably 70° C.-80° C., the inner layer comprises olefin (co)polymers having a melting point in the range 65° C.-105° C., preferably 70° C.-90° C., still more preferably 70° C.-80° C., the core layer comprises olefin (co)polymers of propylene and/or butene having melting point equal to or higher than 140° C., preferably from 140° C. to 170° C., wherein the film wrapping the single packs (film (O)) consists of one or more olefin (co)polymers having a melting point higher than 120° C., generally in the range >120° C.-170° C., preferably 125° C.-165° C., wherein the sealing temperature between the outer layer/outer layer, outer layer/inner layer, inner layer/outer layer of the naked collation multilayer film is in the range 60-80° C., preferably 60-78° C., more preferably 70-78° C. and there is no sealing between film (O) and the inner layer of the naked collation multilayer film in the sealing temperature range.

More specifically, in the multilayer films of the present invention:

the outer layer is formed of olefin (co)polymers and one or more additives, the inner layer is formed of olefin (co)polymers and one or more additives, the core layer is formed of olefin (co)polymers of propylene and/or butene and one or more additives, the film (O) is formed of olefin copolymers and one or more additives and it has a melting point in the range >120° C.-170° C., wherein the one or more additives confer to the layer one or more of the following properties: antistatic, slip, vapour-barrier, antifog, mechanical, flame retardant, optical, anti-block,
wherein in each layer the amount of the one or more additives ranges from 0 to 10% by weight with respect to the layer weight, the layer being constituted of the additive+ one or more (co)polymers,
wherein the sealing temperature is in the range 60-78° C.

The inner layer of the naked multilayer film of the present invention comes into contact with the film wrapping the single packs.

The naked multilayer films of the invention are preferably stretched by biaxial simultaneous stretching in the MD machine direction and in the TD transversal direction. To obtain good mechanical properties in MD, the biaxial stretching on flat die filming process is preferably used. The Lisim® technology is preferably used.

The single packs are preferably cigarette packs arranged one close to the other.

The olefin (co)polymers of the outer layer and the inner layer are equal to or different from each other. The olefin (co)polymers of the outer layer can be one or more provided that the melting point of the olefin (co)polymers is comprised in the range 65° C.-85° C., preferably 70° C.-85° C., still more preferably 70° C.-80° C.

The olefin (co)polymers of the inner layer can be one or more provided that the melting point of the one or more (co)polymers is in the range 65° C.-90° C., preferably 70° C.-90° C., still more preferably 70° C.-80° C.

The olefin (co)polymers that can be used for the inner and outer layer are generally ethylene copolymers comprising one or more alpha-olefin comonomers, linear or branched, having from 3 to 12, preferably from 3 to 8 carbon atoms. Propylene, butene, in particular butene-1, hexene, octene, decene and dodecene can for example be mentioned as monomers. The alpha-olefin total amount is in general comprised from 2% to 50%, preferably from 10% to 40%, more preferably from 15% to 35% by moles. The propylene may range from 0 to 40%, generally from 5% to 30% by moles. The total sum of the comonomers is 100% by moles.

Other olefin copolymers that can be used are based on propylene, comprising one or more alpha-olefin comonomers, linear or branched, having from 4 to 12, preferably from 4 to 8 carbon atoms, and optionally ethylene. As olefin comonomers, ethylene, butene, preferably butene-1, hexene, octene, decene and dodecene can for example be mentioned. The amount of butene, hexene, octene, decene and dodecene is generally not greater than 2-50%, preferably 10-40%, more preferably 15-35% by moles. The ethylene amount ranges from 0-40%, preferably 3-15%, more preferably 5-10% by moles.

The total sum of the olefin comonomers being 100% by moles.

Together with the above indicated monomers, monomers containing more than one ethylenic unsaturation can also be used. It can for example be cited dienes, conjugated or not, linear or branched when possible from 4 to 20 carbon atoms or cyclic wherein the ring has 5 or 6 carbon atoms, preferably vinylcycloalkenes, as for example vinylcyclohexene; aromatic, for example cyclopentadiene; vinylaromatic for example styrene, 2,4 vinylstyrene, optionally one or more hydrogen atoms of the ring being substituted with saturated alkyl groups from 1 to 12 carbon atoms or unsaturated alkyl groups from 2 to 12 carbon atoms, optionally one or more carbon atoms of the ring being substituted by heteroatoms, preferably selected from nitrogen, oxygen, sulphur.

As monomers containing more than one ethylenic unsaturation, conjugated dienes, for example butadiene, isoprene, piperylene, 1,3-hexadiene, 1,3-octadiene, 2,4-decadiene, cyclopentadiene; non conjugated dienes as 1,4-hexadiene, 7-methyl-1,6-octadiene; cyclic non conjugated dienes as norbornene, ethylidennorbornene, 4-vinylcyclohexene and vinylaromatic monomers as styrene, 2,4-vinylstyrene etc., can be mentioned.

The amount of dienes is in the range 0-50% by moles, preferably 0.1-25%, more preferably 0.1-10%, even more preferably 0.1-3%.

Both in the ethylene and propylene-based copolymers other comonomers, such as for example dienic monomers, can be present. Cyclopentadiene and terpenes can in particular be mentioned in amounts up to 10% by moles, preferably from 0 to 5%.

Typical examples of ethylene-based copolymers are ethylene/propylene; ethylene/propylene/butene; ethylene/butene/hexene; ethylene/butene/octene, etc.

Examples of propylene-based copolymers are propylene/ethylene, propylene/ethylene/butene, propylene/butene/ethylene etc.

The total sum of the comonomers is 100% by moles.

The polymers of the core layer are preferably selected from propylene and/or butene homopolymers.

Generally the propylene homopolymers have an extractable amount in hexane preferably lower than 10% by weight, generally lower than 3% by weight.

The extractable fractions in n-hexane are determined by extraction at 50° C. for 2 hours, on the basis of the method according to the FDA 177-1520 Standard.

Preferably among the naked three-layer films of the invention those having as inner layer a compounded masterbatch containing EXACT 0203 and as outer layer a compounded masterbatch containing EXACT 8203 are excluded from the present invention. The film surface can be optionally treated with a discharge treatment, for example corona.

The films (O) wrapping the single packs are constituted of ethylene-based copolymers or propylene-based copolymers as indicated above for the outer layer or the inner layer of the naked collation film.

The ethylene-based copolymers contain an amount of alpha-olefin preferably in the range 1-20%, more preferably 3-10% by moles. The propylene-based copolymers contain an amount of alpha-olefin preferably in the range 1-20% by moles. Generally, the amount of alpha-olefin comonomers is in the range 3-5<5 by weight.

The above olefin (co)polymers are obtained by polymerization with Ziegler Natta catalysts or metallocene catalysts.

The polymerization for obtaining (co)polymers can be carried out by operating in suspension, in an inert diluent, in emulsion or in a gas phase, the temperatures being generally in the range 0° C.-150° C. at a pressure generally in the range 1-300 bar, optionally by using a chain transfer agent, for example hydrogen.

Metallocene polymerization can take place by using catalysts comprising the reaction product between:
1) a bis-cyclopentadienyl derivative of general formula

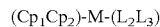

containing oxygen including groups bound to the transition metal wherein M is a metal selected from group IIIb to group Vb or of the lanthanide series of the periodic table of the elements; $Cp_1$ and $Cp_2$, equal to or different from each other, represent the following groups linked to M with delocalized π bonds, in particular with an eta 5 bond when the groups are selected from cyclopentadiene, indene, fluorene or their derivatives substituted in the case of indene and fluorene also with the hydrogenated phenyl ring (rings), and with substituents both in the phenyl and in the cyclopentadienyl rings, also with heteroatoms; or with π bonds as for example in the cyclooctatriene case; otherwise said groups $Cp_1$ $Cp_2$ constrained with M through a bivalent linking bridge, for example of the —R— type wherein R is an alkylene preferably from 1 to 4 carbon atoms, —Si(R')$_2$— type wherein R' is an alkyl from 1 to 10 C atoms, preferably from 1 to 6 carbon atoms; or an aryl optionally containing heteroatoms, such as O, N, or alkylaryl or arylalkyl from 7 to 20 carbon atoms;

$L_2$ or $L_3$ equal to or different from each other represent a OR$_a$ group where $R_a$ is an aryl group, optionally the carbon atoms of the ring being substituted also with heteroatoms, and optionally containing substituents for example alkyl from 1 to 10 carbon atonms with 2) a cocatalyst selected from the compounds represented by following formulas:

2a) alumoxane, of general formula:

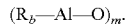

under the form of a cyclic compound or as a linear polymeric compound having formula:

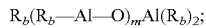

in general alumoxane is a mixture of the two above indicated forms;

$R_b$ is an alkyl group from 1 to 5 C atoms, preferably selected from methyl, m is an integer from 1 to 30, preferably from 4 to 20;

m' is an integer from 3 to 20, preferably from 4 to 20;

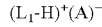 2b)

wherein (A)$^-$ is a compatible not coordinating anion, it is preferably

wherein $L_1$ is a neutral Lewis base, $(L_1\text{-H})^+$ is a Bronsted acid,

B is an element of the group from IIIa up to VIa of the periodic table of the elements having metalloid characteristics, preferably boron, phosphorus or arsenic in the valence state 3 or 5, silicon, more preferably boron in the valence state 3;

Q, equal to or different from each other, are selected from the following groups: hydrides, halides, alkyls, aryls optionally substituted, for example with halogens, preferably F, alkoxides, aryloxides, dialkylamido, or $R_0COO^-$ wherein $R_0$ ranges from 1 to 20 carbon atoms, with the proviso that Q can be equal to halide only once;

q is an integer equal to the valence of B plus 1.

The preferred co-catalyst component 2) is 2b).

The alumoxane compound 2a) of the catalytic system is preferably prepared by reaction of aluminum triethyl and water, obtaining a mixture of linear and cyclic compounds. In general they are prepared by contacting a solution of aluminum trialkyl with water in suitable organic solvents, for example aliphatic hydrocarbons.

As known, aluminoxanes are compounds containing Al—O—Al bonds, with a molar ratio in the range O/Al, obtainable in the state of the art by reaction, under controller conditions, of an alkyl aluminum, or alkyl aluminum halide, with water and, in the case of aluminum trimethyl, also with an hydrate salt, as hexahydrate aluminum sulphate, pentahydrate copper sulphate and pentahydrate iron sulphate.

The molar ratio between Al of the component 2a alumoxane and the amount of the metal of component 1 (metallocene) is in the range 10,000:1-100:1, preferably 5,000:1-500:1. In the case of the boron compound (2b) the ratio ranges from (0.1-4):1 to preferably (0.5-2.0):1.

These catalysts are obtained for example by direct reaction of bis-cyclopentadienyl metal dialkyl, preferably dimethyl with the corresponding phenols. The reaction gives substantially quantitative yields. The corresponding phenol can be used in excess as it can also serve as a reaction solvent. Other solvents are for example cyclohexane, methylcyclohexane, hexane, diethylether, benzene, toluene, etc.

The polymers of the core layer are generally homopolymers. In particular propylene or butene homopolymers, preferably butene-1. The propylene homopolymers are preferred.

The thickness of the naked film is generally in the range 10-60 μm, preferably 12-40 μm, more preferably 12-30 μm.

The core layer has a thickness of 8-38 μm.

The thickness of the inner layer and of the outer layer equal to or different from each other is in the range 0.3-4 μm, preferably 0.5-1 μm.

The naked multilayer films of the invention are obtainable by extrusion and subsequent biaxial simultaneous stretching in the MD machine direction and in the TD transversal direction. For obtaining good mechanical properties in particular in MD, the biaxial stretching on flat die is preferably used, preferably by means of the Lisim® machine. This Lisim® technology uses a biaxial simultaneous stretching process, for example as described in U.S. Pat. No. 4,853,602 and subsequent patents describing this technology.

The biaxial stretching process comprises the following steps:

coextrusion of a multilayer plate of the film of the invention having a thickness preferably comprised between about 1 and about 4 mm;

plate quenching on a chilled roll, at a temperature preferably between 10 and 40° C.;

plate heating at a temperature comprised between about 100° and about 400° C., preferably by infrared rays;

plate stretching and obtaining the film by taking the edges of the plates, having an higher thickness than the plate, with a series of pliers or clamps independently driven by linear synchronous induction motors, each pliers or clamp sliding on a rail and being pulled by a permanent magnet or by a couple of permanent magnets, pushed by the magnetic wave created by the polar expansions of the linear motor; each section of the stretching frame having a series of linear synchronous induction motors arranged in a contiguous way, fed by alternating currents with phase and frequency modulated so as to vary continuously the clamp (pliers) speed and thus the longitudinal stretching ratios of the film; the transversal stretching ratios being regulated by intervening on the divergence of the rails on which the pliers or clamps slide. The stretching frame comprising one or more sections placed inside an oven having temperatures comprised between about 80° C.-210° C., preferably 120° C.-190° C.; in general the longitudinal stretching ratios being comprised between 3:1 and about 10:1 and the transversal stretching ones between about 3:1 and about 10:1.

The temperatures in each part of the above mentioned apparatus are selected so as to favour the biaxial orientation of the polymeric chains of the used polymers.

The longitudinal stretching ratio can be considered equal to the ratio between the speed of the film outletting the stretching frame and the speed of the film inletting the stretching frame.

The transversal stretching ratio can be considered equal to the ratio between the film width at the outlet of the stretching frame and the film width at the inlet in the stretching frame.

The possibility given by the simultaneous stretching equipment of varying the MD stretching ratio in a wide range allows to obtain improved mechanical properties in the longitudinal or MD direction. This makes it possible the use of the naked multilayer film in high speed machines for naked collation, for example even with a machine rate of 1,000 single packs/minute corresponding to 100 packages/minute, each package containing 10 packs. As a matter of fact, notwithstanding the high speed, it is possible to maintain the cut length.

The naked multilayer film of the invention can also be formed of more than three layers provided that the inner layer, the core layer and the outer layer are as defined above. One can have 5 or more layers, for example 7. The additional layers are equal to or different from the previous ones. In the layers additives can be added such as to confer to the naked multilayer film properties known in the art, for example antistatic, slip, vapour-barrier, antifog, mechanical, flame retardant, optical, antiblock.

The amount of said additives is no more than 10% by w for each layer, wherein the % by w is referred to the sum additives+ (co)polymers that constitute the layer. Generally the additives are added in the outer layer and in the inner layer of the film of the present invention. However they can be added also in one or more of the other layers.

The additives are those well known in the art.

As an example slip agents can be selected from higher aliphatic amides, unsaturated fatty acid amides, saturated fatty acid amides such as stearic acid amide, erucic acid amide; higher aliphatic esters; waxes and metal soaps as well as polydimethylsiloxanes; silicon spheres having a diameter from 1 to 4 μm.

The antistatic agents can be selected from alkali metal alkanesulfonates, polyether-modified, i.e. ethoxylated and/or propoxylated polydiorganosiloxane (polydialkylsiloxanes polyalkylphenylsiloxanes and the like), and/or the essentially straight chain saturated aliphatic tertiary amines, which have an aliphatic radical having 10 to 20 carbon atoms and are substituted by ω-hydroxy-$(C_2-C_4)$-alkyl groups, N,N-bis-(2-hydroxyethyl alkylamines having from 10 to carbon atoms, preferably 12 to 18 carbon atoms, in the alkyl radical, are suitable. Furthermore, also glycerol monostearate can be used.

Additives that improve mechanical properties are for example hydrocarbon resins.

Additives with vapour barrier properties are for example hydrocarbon resins.

Additives with antiblock properties are for example inorganic compounds such as $SiO_2$, $CaCO_3$, magnesium silicate, aluminium silicate, calcium phosphate and the like, and/or incompatible organic polymers such as polyamides, polyesters, polycarbonates and the like, preferably benzoguanamine/formaldehyde polymers, silica and calcium carbonate.

Antifog additives are, for instance, esters of glycerol and fatty acids and/or ethoxylated aliphatic amines.

The additional layers can be based on olefinic (co)polymers or polymers such as for example EVA (ethylvinylacetate polymer), EVOH (ethyl-vinylalcohol polymer), hydrocarbon resins, polyamides, if desired, compatibilizing polymers, etc. can be used.

The naked multilayer film can also be subjected to the surface treatments known in the art, for example corona, flame treatment, etc. for obtaining improved and more lasting printability and metallizability, while maintaining at the same time the flexibility and mechanical properties.

The naked multilayer films of the present invention can also be printed, for example by using a primer if requested and subsequent deposition of an ink layer, and then printing by using flexography or rotogravure.

The naked multilayer film of the present invention used for naked collation of packs (e.g. cigarette packs) to obtain packages is easily removable and allows to avoid the use of cutting tools, so as to safely carry out this operation.

As said, this was a need felt in the market that the Applicant, after a long research was able to solve surprisingly and unexpectedly.

As said, the sealing temperature of the multilayer films of the invention is in the range 60° C.-80° C., preferably 60° C.-78° C., more preferably 70-78° C., determined according to the test reported under in the examples.

A further object of the present invention is the use of the naked multilayer films of the present invention for naked collation of packs.

It has been unexpectedly and surprisingly found by the Applicant that by using the naked multilayer film of the invention a very good sealing is obtained at the above indicated low temperatures between the outer layer/outer layer, between the outer layer/inner layer and between the inner layer/inner layer without any sealing between the inner layer of the multilayer film and the film wrapping the single packs.

This feature was highly desired by the market because it provides the full functionality of the naked collation film.

It has been found by the Applicant that it is possible to prepare the films of the present invention with the above improved mechanical properties, especially in MD direction, when a biaxial stretching on flat die filming process is used, achievable with Lisim® machine. This technology allows to obtain naked films capable to seal at the indicated temperatures 60° C.-80° C., preferably 70-80° C., preferably 60-78° C. as shown in the examples and without the sealing to the film wrapping the single packs.

A further object of the present invention is a process for forming a naked collation package comprising:
supplying single packs each wrapped with the one or more olefin copolymer films, as defined above,
supplying a naked collation film of the invention to wrap the single packs arranged one close to the other,
wrapping the single packs arranged one close to the other in the inner layer of the naked collation film and closing the naked collation film by sealing at temperatures in the range 60° C.-80° C., preferably 70° C.-80° C., more preferably 60° C.-78° C.

In the naked collation process of the present invention there is no sealing between the inner layer of the multilayer film and the film wrapping the single packs.

The naked multilayer films of the present invention can be removed from the cigarette packs arranged one close to the other in the package without using cutting tools, by applying a slight twist by hands.

The Applicant has unexpectedly and surprisingly found that by using the naked collation films of the invention it is possible to operate on the manufacturing line at a machine speed such as to produce 70-100 packages/min without any downtime due to sticking of the films to the machine rolls or to the film wrapping the single packs (i.e. single cigarette packs), giving a percentage of waste lower than 1%, preferably lower than 0.1%, more preferably lower than 0.01%.

As waste % it is meant the percentage of discarded packages with respect to the overall amount of produced packages.

The machine used on the manufacturing lines are typically GD® or FOCKE®.

The following examples are given for illustrative purposes, but they are not limitative of the invention.

EXAMPLES

Analytical Methods

Melting Point of the Polymers

The melting point has been determined by DSC.

Determination of the Tensile Strength, Elongation at Break and the Elastic Modulus of the Film The determinations have been carried out according to the ASTM D882 standard both in the MD and in TD direction by an Instron dynamometer. The elastic modulus has been also determined on the film conditioned at room temperature (20-25° C.) for 48 hours after the preparation.

Determination of the Mechanical Strength of the Seal Obtained with the Film-Test Samples having a width of 10 mm are cut out from the film and sealed as described in the examples by using a sealing machine, for example a model "DT Industries SENCORP", with an automatic control of temperature, pressure and contact time of the two sealing bars with the sample to be sealed.

The sealing conditions are the following:
upper bar heated, lower bar not heated,
contact time between the bars: 0.2 s
contact pressure between the bars: 5 psi The sealing temperature is varied in the desired temperature range, for example it can be increased from 65° C. to 80° C. (Table 2) for the sealing outer/inner layer, inner/outer layer and outer/outer layer of the naked collation film.

The seal mechanical resistance has been measured by an Instron dynamometer.

The test is satisfied when the sealing temperature outer layer/inner layer, inner layer/outer layer outer layer/outer layer is in the range 60-80° C. and there is no sealing between the inner layer of the naked collation film and film (O).

The naked collation film complies with the seal mechanical resistance test when the seal mechanical resistance is greater than 50 g/25 mm and at the sealing temperature there is no sealing between the inner layer of the naked collation film and film (O).

Example 1

Films for "Naked Collation"

A naked film according to the present invention was prepared by a process comprising the following steps:

1) Coextrusion of a Three Layer Plate

Three layers were coextruded on a flat die, each layer having the following composition (% by weight):
core layer:
98% propylene homopolymer HP 522H (Basell)
$T_{melting}$=163° C.,
2% antistatic masterbatch ASPA2446,
outer layer:
95% propylene-alpha-olefin copolymer TAFMER XM7070 (Mitsui)
$T_{melting}$=75° C.,
5% antiblock masterbatch ABVT34 SC,
inner layer:
95% TAFMER XM7070,
5% antiblock masterbatch ABVT34 SC.

The amounts of the polymeric components in each layer are such that in the final film, after the biaxial stretching, the single layers result to have the following thicknesses:
core layer: 23 µm
outer layer: 1 µm
inner layer: 1 µm.

The profile of the set of temperatures of the three extrusion lines was the following:
core layer: 230° C.-265° C.
outer layer: 160° C.-185° C.
inner layer: 160° C.-185° C.

All the three coextrusion lines were equipped with a filter for removing from the melted polymer any gels or foreign bodies.

The three lines of the melt were coextruded on a flat die at T=245° C.

2) Cooling and Quenching of the Coextruded Plate

The coextruded plate obtained in step 1) was cooled and quenched on a thermostatted roll at T=28° C., one third of the roll in a water bath at T=30° C.

3) Trimming of the Plate Edges and Heating in an IR Battery

The plate edges were trimmed up to about 5 cm and then the plate was passed through a battery of IR panels having temperatures in the range: 190° C.-270° C.

4) Simultaneous Biaxial Stretching on a Stretching Machine

A LISIM® equipment was used for the biaxial stretching.

The multilayer film was stretched both in MD longitudinal direction and in TD transversal direction by setting on the machine the following stretching ratios:
MD=6.20 (ratio between the outlet and inlet speed);
TD=7.040 (ratio between final and initial TD width):
the outlet speed from the oven being 260 m/min.

The temperatures of the various sections of the oven were in the ranges reported hereinunder:
Preheating section: 154° C.-174° C.
Simultaneous stretching section: 158° C.-162° C.
Stabilization section: 162° C.-168° C.

5) Wrapping of the Naked Film in Reel

At the oven outlet the film was passed to the drive section for the following operations:
edge trimming,
X ray scanning for the thickness control.

At the outlet of the drive section the film was wound on a mother reel having a width of 6,150 mm, thereafter cut into reels of a smaller width.

Film Properties

The mechanical and sealing properties of the naked film have been evaluated.

Mechanical Properties

The obtained results are reported in Table 1 and have been compared with those of a commercial film STILAN® BS25 marketed by BIMO/IRPLAST, having the same total thickness and manufactured with the two step sequential stretching technology, having the same core and a melting temperature of the outer layer 132° C. and of the inner layer 140° C.

TABLE 1

| Properties | | Example 1 | Comparison |
|---|---|---|---|
| Tensile strength | MD | 1760 | 1603 |
| (MPa) | TD | 2304 | 2850 |
| Elongation at break | MD | 105 | 209 |
| (%) | TD | 88 | 63 |
| Elastic modulus | MD | 1816 | 1734 |
| (MPa) at t = 0 h | TD | 2226 | 3207 |

TABLE 1-continued

| Properties | | Example 1 | Comparison |
|---|---|---|---|
| Elastic modulus after ageing for 48 h at room temperature (MPa) | MD | 2432 | 2029 |
| | TD | 2772 | 3770 |

The Table shows that the naked film of Example 1 of the invention, with respect to the comparative film, shows improved mechanical properties in MD direction. As a matter of fact both the tensile strength and the elastic modulus show an higher value. The Table indicates that the difference between the elastic modulus MD of the naked film of the invention with respect to the comparative film results further increased by repeating the same analyses after 48 hours from the film preparation. It is therefore advisable to use the film of the present invention after ageing for at least one week.

Sealing Test

Both the seal strength of the naked collation film of example 1 sealed on itself, and the seal weld strength of the naked film of the invention sealed with a commercial three layer film STILAN® LTS20 commercialized by BIMO/IR-PLAST, were measured. The film STILAN® LTS20 was used for wrapping the single cigarette packs. The film has a core similar to that of the naked film of example 1, the inner and outer layer are made of polyolefinic copolymers having $T_{melting}=132°$ C. The thickness of the film is equal to that of the naked collation film of example 1.

Seal Strength by Sealing the Outer Surface with the Inner Layer of the Naked Collation Film In Table 2 it is reported the seal strength obtained by sealing the outer with the inner layer of the naked film of example 1 at the different temperatures indicated hereunder. As the film is symmetrical, the sealing temperature outer/inner layer is the same as the sealing temperature inner/outer layer and outer/outer layer

TABLE 2

| T (° C.) | 65 | 70 | 75 | 80 |
|---|---|---|---|---|
| Seal strength (g/25 mm) | 0 | 0 | 67 | 94 |

The data of the table show that the outer layer of the naked film of example 1 seals with the inner layer at the temperature of 75° C. already. The value of the seal strength found at this temperature guarantees that the seal is effective for the naked collation of packages of single packs (i.e. cigarette packs), arranged the one close to the other.

Seal Strength of the Naked Film of Example 1 Sealed with the Film Wrapping the Single Packs Table 3 reports the seal strength of the inner layer of the film of example 1 sealed with the film used for wrapping the single packs:

TABLE 3

| T (° C.) | 65 | 70 | 75 | 80 | 85 | 90 | 95 | 100 | 105 | 110 | 115 |
|---|---|---|---|---|---|---|---|---|---|---|---|
| Seal strength (g/25 mm) | 0 | 0 | 0 | 0 | 0 | 0 | 0 | 0 | 0 | 0 | 127 |

The data of Table 3 show that at the sealing temperature of 75° C., the film wrapping the single packs (i.e. cigarette packs) is not sealed by the naked film of the present invention.

The results of the sealing tests of Tables 2 and 3 show that the naked collation film according to the present invention can be used for the naked collation of single packs arranged one close to the other. These results further show that the naked collation film in the sealing temperature interval 65-110° C. does not seal with the films wrapping the single cigarette packs.

Application with FOCKE® Machine

The naked film of example 1 was tested in an industrial application of "naked collation overwrap" for producing packages each of 10 cigarette packs. The test conditions were the following:

line speed: 700 packs/min, or 70 packages/min.

The sealing between inner layer/outer layer, outer layer/outer layer, outer layer/inner layer of the film of the invention was obtained at 75° C. already and there was no sealing between the inner layer and the film wrapping the single cigarette packs.

After 1 hour run the production was stopped. it was noticed that no waste was formed.

During the process it was not necessary to stop the machines for cleaning, as the naked film did not release powders.

The higher mechanical properties in MD direction allowed a better precision and maintenance of the cut length.

This is an advantage with respect to the films lacquered with acrylic solution commonly used for the naked collation.

Opening of the Naked Collated Packages

A multi-pack naked collated package prepared on the FOKE® machine line was opened by twisting it slightly with hands. No adhesion of the naked film of the invention to the film wrapping the cigarette packs (film (O)) was noticed.

Application with GD® Machine

The application example with the FOCKE machine was repeated but using aw GD machine at a line speed of 800 packs/min, or 80 packs/min.

During the process no downtime for cleaning was made, as the film did not release powders.

The higher mechanical properties in MD direction allowed a better maintenance of the cut length.

Also in this case the sealing between the inner layer/outer layer, outer layer/outer layer, outer layer/inner layer of the naked film of the invention was obtained at 75° C. already and no sealing was noticed between the inner layer of the naked collation multilayer film and the film wrapping the single cigarette packs.

After 1 hour run the production was stopped. No waste was formed.

Opening of the Naked Collated Packages

A naked collated package manufactured with the GD machine was opened by twisting it slightly with hands. No adhesion of the naked film of the invention to the film wrapping the single cigarette packs was noticed.

Example 2

Comparative

By using the same process described in example 1 a three layer film was prepared having the following composition:
core layer:
98% propylene homopolymer HP 522H (Basell),
$T_{melting}$=163° C.
2% antistatic masterbatch ASPA2446,
outer layer:
95% propylene-alpha olefin copolymer TAFMER XM7070 (Mitsui)
$T_{melting}$=75° C.,
5% antiblock masterbatch ABVT34 SC,
inner layer:
95% polyolefinic copolymer ADSYL 7462 (Basell)
$T_{melting}$=127° C.,
5% antiblock masterbatch ABVT34 SC.
Sealing Tests The sealing tests have been carried out as described in example 1.

In Table 4 the results obtained by sealing the outer layer/inner layer of the film of comparative ex. 2 are reported.

TABLE 4

| T (° C.) | 65 | 70 | 75 | 80 | 85 | 90 | 95 |
|---|---|---|---|---|---|---|---|
| Seal strength (g/25 mm) | 0 | 0 | 0 | 0 | 76 | 83 | 90 |

The data of Table 4 show that the sealing between the outer layer/inner layer of the film of example 2 is obtained starting from a temperature of 85° C.

Application with FOCKE® Machine

The application process using the FOCKE® machine described in example 1 was repeated by using the multilayer film of comparative example 2.
Line speed: 700 packets/min, or 70 packs/min;

The sealing between the inner layer and outer layer of the film was obtained starting from 85° C.

It was however noted that at these temperatures the inner layer of the film of the comparative example 2 sticks to the film wrapping the single cigarette packs. The waste was about 10%. The Application was stopped after a short time (6 minutes).

From an industrial point of view this percentage of scraps makes the film of example 2 not suitable for an industrial application.

The invention claimed is:

1. A process for naked collation of packs to form packages of 6 or more packs each wrapped in a film wrapping the single packs, by using multilayer films, comprising at least a core layer, an inner layer and an outer layer wherein:
the outer layer comprises olefin (co) polymers having a melting point in the range 65° C.-85° C.,
the inner layer comprises olefin (co)polymers having a melting point in the range 65°-105° C.,
the core layer comprises olefin (co)polymers of propylene and/or butene having a melting point equal to or higher than 140° C.,
wherein the film wrapping the single packs consists of one or more olefin (co) polymers having a melting point higher than 120° C.,
comprising the step of sealing between the outer layer/outer layer, outer layer/inner layer, inner layer/outer layer, inner layer/inner layer of the naked collation multilayer film at a temperature in the range 60-80° C.,
wherein there is no sealing between the film wrapping the single packs and the inner layer of the naked collation multilayer film in the sealing temperature range.

2. A process according to claim 1, wherein the multilayer films are films simultaneously biaxially stretched in longitudinal direction and in transversal direction on a flat die filming process and then wound in reels.

3. A process according to claim 1, wherein the inner layer and the outer layer have a same or different thickness, the thickness being in the range 0.5-1 µm.

4. A process according to claim 1, wherein the multilayer films are obtainable by a biaxial stretching on a flat die filming process comprising the following steps:
coextrusion of a multilayer plate of the multilayer film having a thickness comprised between about 1 and about 4 mm;
quenching of the multilayer plate on a chilled roll, at a temperature between 10 and 40° C.;
heating of the multilayer plate at a temperature comprised between 100° and 400° C., by infrared rays;
stretching in a stretching frame of the multilayer plate with edges having a higher thickness than the plate in longitudinal and transversal directions and obtaining the multilayer film by taking the edges of the multilayer plates, with a series of pliers or clamps independently driven by linear synchronous induction motors having polar expansions producing magnetic waves, each plier, or clamp sliding on a rails, showing a divergence in the transversal stretching and being pulled by a permanent magnet or by a couple of permanent magnets, pushed by the magnetic wave created by the polar expansions of the linear motor; each section of the stretching frame having a series of linear synchronous induction motors arranged in a contiguous way, fed by alternating currents with phase and frequency modulated so as to vary continuously the clamp (pliers) speed and thus the longitudinal stretching ratios of the film; the transversal stretching ratios of the film being regulated by intervening on the divergence of the rails on which the pliers or clamps slide, the stretching frame comprising one or more sections placed inside an oven having temperatures comprised between about 80° C.-210° C.; the longitudinal stretching ratios of the film being comprised between 3:1 and about 10:1 and the transversal stretching ratios of the film between about 3:1 and about 10:1.

5. A process according to claim 1, wherein by operating on a line for manufacturing packages at a machine speed of 70-100 packages/min the percentage of waste is lower than 1%, the waste percentage defined as the percentage of discarded packages with respect to the overall amount of produced packages.

6. A process according to claim 1, wherein:
the outer layer is formed of olefin (co)polymers and one or more additives,
the inner layer is formed of olefin (co)polymers and one or more additives,
the core layer is formed of olefin (co)polymers of propylene and/or butene and one or more additives,
the film wrapping the single packs is formed of olefin copolymers and one or more additives and it has a melting point in the range greater than 120° C.-170° C., wherein the one or more additives confer to the layer one or more of the following properties: antistatic, slip, vapour-barrier, antifog, mechanical, flame retardant, optical and antiblock, the amount of the one or more additives ranges from 90 to 10% by weight with respect to the layer, wherein the sealing temperature is in the range 60-78° C.

7. A process according to claim 1, wherein the single packs are cigarette packs arranged one close to the other.

8. A process according to claim 1, wherein the outer layer and the inner layer comprise olefin (co)polymers equal to or different from each other.

9. A process of according to claim 1, wherein the outer layer contains one or more olefin (co) polymers, wherein the melting point of each of the (co)polymers is in the range 65° C.-85° C.

10. A process according to claim 1, wherein the inner layer contains one or more olefin (co)polymers wherein the melting point of each of the (co)polymers is in the range 65° C.-105° C.

11. A process according to claim 1, wherein the (co)polymers of the inner layer and of the outer layer are selected from ethylene copolymers comprising one or more linear or branched alpha-olefin comonomers having from 3 to 12 carbon atoms or from propylene copolymers, comprising one or more linear or branched alpha-olefin comonomers having from 4 to 12 carbon atoms and optionally ethylene.

12. A process according to claim 1, wherein the core layer consists essentially of propylene and/or butene homopolymers having a melting temperature in the range 140-170° C.

13. A process according to claim 1, wherein the multilayer film has thickness in the range of 10-60 µm, the core layer has thickness in the range of 8-38 µm.

14. A process according to claim 1, wherein the longitudinal stretching ratios are in the range 3:1-10:1 and the transversal stretching ratios are in the range 3:1-10:1.

15. A process according to claim 1, wherein the multilayer films comprise more than three layers; the inner, outer and core layer of the multilayer films being the inner, outer and core layers as defined in claim 1 and the more than three layers being equal to or different from each other and from the inner, outer and core layer.

16. A process of naked collation packaging with the multilayer films of claim 1, comprising:
    supplying single packs, each wrapped in the film wrapping the single packs,
    supplying a multilayer film for naked collation to wrap the single packs arranged one close to the other,
    wrapping the single packs arranged one close to the other in the inner layer of the naked collation multilayer film and closing the naked collation multilayer film by sealing the naked collation multilayer film at a temperatures in the range of 60° C.-80° C.

* * * * *